United States Patent
Tojo et al.

(10) Patent No.: US 7,727,296 B2
(45) Date of Patent: Jun. 1, 2010

(54) COLLECTING UNIT FOR SEMICONDUCTOR PROCESS

(75) Inventors: Yukio Tojo, Nirasaki (JP); Naotaka Noro, Nirasaki (JP); Yoshiyuki Fujita, Nirasaki (JP); Yuji Ito, Oshu (JP)

(73) Assignee: Tokyo Electron Limited, Tokyo (JP)

(*) Notice: Subject to any disclaimer, the term of this patent is extended or adjusted under 35 U.S.C. 154(b) by 308 days.

(21) Appl. No.: 11/905,990

(22) Filed: Oct. 5, 2007

(65) Prior Publication Data
US 2008/0104935 A1    May 8, 2008

(30) Foreign Application Priority Data
Oct. 10, 2006    (JP) .............................. 2006-276462

(51) Int. Cl.
*B01D 45/00* (2006.01)
(52) U.S. Cl. ............ 55/385.1; 55/434.2; 55/434.4; 55/443; 55/462; 55/465; 55/DIG. 15; 95/288; 118/715; 438/905
(58) Field of Classification Search ......... 55/385.1, 55/385.2, 434.2, 434.3, 434.4, 462, 465, 55/DIG. 15, 429, 436, 442, 443, 444, 445, 55/446; 118/715; 95/288, 290; 438/905
See application file for complete search history.

(56) References Cited

U.S. PATENT DOCUMENTS

| | | | | |
|---|---|---|---|---|
| 5,746,790 A | * | 5/1998 | Niimura et al. ............... | 55/317 |
| 5,820,641 A | * | 10/1998 | Gu et al. .................... | 55/434.4 |
| 5,904,757 A | * | 5/1999 | Hayashi et al. .............. | 96/416 |
| 6,156,107 A | * | 12/2000 | Hayashi et al. .............. | 96/416 |
| 6,488,745 B2 | * | 12/2002 | Gu .............................. | 95/272 |
| 6,547,844 B2 | * | 4/2003 | Rikyuu et al. ............. | 55/315.1 |
| 6,966,936 B2 | * | 11/2005 | Yamasaki et al. .......... | 55/385.2 |

(Continued)

FOREIGN PATENT DOCUMENTS

JP        03-031479        2/1991

(Continued)

OTHER PUBLICATIONS

Machine Translation of the Detailed Description of JP 2004-343095, published Dec. 2, 2004.*

*Primary Examiner*—Michael A Marcheschi
*Assistant Examiner*—Robert A Clemente
(74) *Attorney, Agent, or Firm*—Smith, Gambrell & Russell, LLP

(57) ABSTRACT

A collecting unit is disposed on an exhaust passage of a semiconductor processing apparatus to collect by-products contained in an exhaust gas. The collecting unit includes a trap body detachably disposed inside a casing and configured to collect a part of the by-products. The trap body includes fins arrayed in a flow direction of the exhaust gas and having a surface on which a part of the by-products is deposited and trapped. The collecting unit further includes a receiving mechanism disposed inside the casing and configured to receive a part of the by-products that peels off from the trap body or an inner surface of the casing to prevent this part from being deposited on a bottom of the casing. The receiving mechanism is configured to allow a part of the by-products held thereon to be in contact with a cleaning gas from above and from below.

18 Claims, 9 Drawing Sheets

U.S. PATENT DOCUMENTS

| | | | |
|---|---|---|---|
| 7,044,997 B2 * | 5/2006 | Mardian et al. | 95/1 |
| 7,329,292 B2 * | 2/2008 | Mardian et al. | 55/282 |
| 7,537,628 B2 * | 5/2009 | Tsuji | 55/442 |
| 2002/0100417 A1 * | 8/2002 | Suzuki et al. | 118/715 |

FOREIGN PATENT DOCUMENTS

| | | |
|---|---|---|
| JP | 04-155827 | 5/1992 |
| JP | 06-151396 | 5/1994 |
| JP | 2004-343095 | 12/2004 |

* cited by examiner

COLLECTING UNIT FOR SEMICONDUCTOR PROCESS

BACKGROUND OF THE INVENTION

1. Field of the Invention

The present invention relates to a collecting unit used for a semiconductor processing apparatus for processing a target substrate, such as a semiconductor wafer, and a film formation apparatus for a semiconductor process provided with the collecting unit. The term "semiconductor process" used herein includes various kinds of processes which are performed to manufacture a semiconductor device or a structure having wiring layers, electrodes, and the like to be connected to a semiconductor device, on a target substrate, such as a semiconductor wafer or a glass substrate used for an FPD (Flat Panel Display), e.g., an LCD (Liquid Crystal Display), by forming semiconductor layers, insulating layers, and conductive layers in predetermined patterns on the target substrate.

2. Description of the Related Art

In manufacturing semiconductor devices for constituting semiconductor integrated circuits, a target substrate, such as a semiconductor wafer (made of, e.g., silicon) is subjected to various processes, such as film formation, etching, oxidation, diffusion, reformation, annealing, and natural oxide film removal. There is a vertical film formation apparatus (of the so-called batch type), which performs a film formation process on a plurality of semiconductor wafers all together.

In the vertical film formation apparatus, semiconductor wafers are first transferred from a wafer cassette onto a vertical wafer boat and supported thereon at intervals in the vertical direction. The wafer cassette can store, e.g., 25 wafers, while the wafer boat can support 30 to 150 wafers. Then, the wafer boat is loaded into a process container of the hot wall type from below, and the process container is airtightly closed. Then, a predetermined film formation process is performed, while the process conditions, such as process gas flow rates, process pressures, and process temperatures, are controlled.

Reaction products generated during the film formation process are deposited (adhered) not only on the surface of the semiconductor wafer, but also on, e.g., the inner surface of the process container and other members, the latter being as by-product films. If the film formation process is continued while by-product films are present on the inner surface of the process container, a stress is generated and causes peeling of some of the by-product films and the quartz of the process container due to a difference in coefficient of thermal expansion between the quartz and by-product films. Consequently, particles are generated, and may decrease the yield of semiconductor devices to be fabricated and/or deteriorate some components of the processing apparatus.

In order to solve this problem, cleaning of the interior of the process container is performed after the film formation process is repeated several times. Conventionally, for example, hydrogen fluoride (HF) solution is typically used to clean the process container. In this case, by-product films are removed by wet etching. However, this wet etching requires work operations for detaching the process container, manually cleaning the container, and then reattaching and adjusting the container. Further, the heat-processing apparatus needs to be shut down for a long time, thereby increasing downtime of the apparatus and lowering the operating rate thereof.

In light of this problem, in recent years, dry cleaning accompanied by no disassembling of a process container is widely used. In this dry cleaning, the interior of the process container is heated at a predetermined temperature by a heater, and a cleaning gas, such as a mixture gas of fluorine and a halogen-containing acidic gas, is supplied into the reaction tube. The by-product films deposited on the inner surface of the process container are thereby dry-etched and removed by the cleaning gas. This trend in the cleaning process is seen not only for film formation apparatuses of the batch type but also for film formation apparatuses of the single-substrate type which process semiconductor wafers one by one.

Jpn. Pat. Appln. KOKAI Publications No. 3-31479, No. 4-155827, No. 6-151396, and No. 2004-343095 disclose techniques concerning a cleaning process of this kind.

In the film formation apparatus described above, gas exhausted from the process container contains by-products generated by film formation. Accordingly, in order to collect and remove the by-products from the exhaust gas, the exhaust system connected to the process container is provided with a collecting unit for removing the by-products.

FIG. 11 is a sectional view showing a conventional collecting unit used in a case where an $SiO_2$ thin film is deposited by use of, e.g., TEOS (tetraethylorthosilicate) as a film formation gas. As shown in FIG. 11, the collecting unit 2 includes a cylindrical casing 4 and a trap body 6 disposed therein. The casing 4 has a gas inlet 4A formed at one end, and a lid 10 detachably connected to the other end by bolts 8. The lid 10 has a gas outlet 4B formed at the center.

The trap body 6 includes a plurality of metal fins 12, each of which is formed of a circular ring, are attached to support rods 14 at predetermined intervals. The trap body 6 includes a semispherical cover 16 on the upstream side, while the trap body 6 is attached to and supported by the lid 10 on the downstream side.

In the structure described above, during film formation, gas exhausted from a process container enters the casing 4 of the collecting unit 2 through the gas inlet 4A. This exhaust gas comes into contact with the surface of the fins 12, flows through the center of the ring fins 12, and is exhausted through the gas outlet 4B. At this time, by-products contained in the exhaust gas are deposited and trapped on the surface of the fins 12, and thereby removed from the exhaust gas.

In this case, the by-products are trapped mainly by the fins 12, but they can be deposited on any portion which the exhaust gas comes into contact with. Accordingly, the by-products are removed from the exhaust gas while some of them are deposited on the surface of the cover 16, the inner surface of the casing 4, and so forth.

The by-products thus trapped are removed along with by-products inside the process container by a cleaning gas, such as $ClF_3$ gas or HF gas, when the cleaning gas is supplied to clean the interior of the process container. Hence, the collecting unit 2 is prevented from being clogged.

BRIEF SUMMARY OF THE INVENTION

An object of the present invention is to provide a collecting unit for a semiconductor process, which allows collected by-products to be efficiently removed in a short time, and a film formation apparatus for a semiconductor process provided with the collecting unit.

According to a first aspect of the present invention, there is provided a collecting unit to be disposed on an exhaust passage of a semiconductor processing apparatus to collect by-products contained in an exhaust gas flowing through the exhaust passage, the collecting unit comprising: a casing having a gas inlet and a gas outlet and configured to form a part of the exhaust passage; a trap body detachably disposed inside the casing and configured to collect a part of the by-products contained in the exhaust gas, the trap body including a plurality of fins arrayed in a flow direction of the exhaust gas, and each of the fins having a surface on which a part of the by-products is deposited and trapped; and a receiving mechanism disposed inside the casing and configured to receive a part of the by-products that peels off from the trap body or an inner surface of the casing to prevent this part from being deposited on a bottom of the casing, the receiving mechanism being configured to allow a part of the by-products held thereon to be in contact with a cleaning gas from above and from below.

According to a second aspect of the present invention, there is provided a film formation apparatus for a semiconductor process, comprising: a process container configured to accommodate a target substrate; a support member configured to support the target substrate inside the process container; a heater configured to heat the target substrate inside the process container; an exhaust system configured to exhaust an interior of the process container; a film formation gas supply circuit configured to supply a film formation gas into the process container; and a cleaning gas supply circuit configured to supply a cleaning gas into the process container, wherein the exhaust system includes a collecting unit disposed on the exhaust passage to collect by-products contained in an exhaust gas flowing through the exhaust passage, and the collecting unit comprises a casing having a gas inlet and a gas outlet and configured to form a part of the exhaust passage, a trap body detachably disposed inside the casing and configured to collect a part of the by-products contained in the exhaust gas, the trap body including a plurality of fins arrayed in a flow direction of the exhaust gas, and each of the fins having a surface on which a part of the by-products is deposited and trapped, and a receiving mechanism disposed inside the casing and configured to receive a part of the by-products that peels off from the trap body or an inner surface of the casing to prevent this part from being deposited on a bottom of the casing, the receiving mechanism being configured to allow a part of the by-products held thereon to be in contact with a cleaning gas from above and from below.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 11:
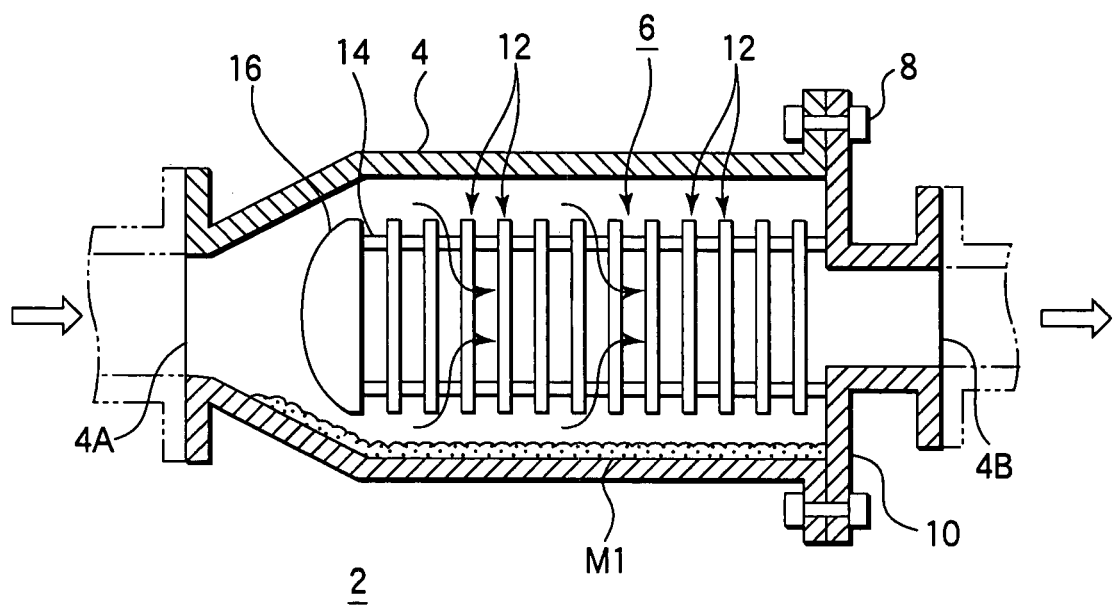
FIG. 11 is a sectional view showing a conventional collecting unit used in a case where an $SiO_2$ thin film is deposited by use of, e.g., TEOS as a film formation gas.

In the process of developing the present invention, the inventors studied problems with regard to the collecting unit for an exhaust system shown in FIG. 11. As a result, the inventors have arrived at the findings given below.

As described above, the interior of the collecting unit 2 is cleaned together with the interior of the process container. In order to remove the by-products deposited on the surface of the fins 12 and so forth, a cleaning gas needs to be supplied for, e.g., three hours.

However, when this cleaning process proceeds to some extent in the collecting unit 2, by-products deposited on the surface of the fins 12 and cover 16 and the inner surface of the casing 4 decrease their adhesive force and may peel off therefrom. FIG. 11 shows the collecting unit 2 set in a horizontal state, and thick by-products M1 deposited on the bottom (the lower side in FIG. 11) of the casing 4.

Where such thick by-products M1 are deposited, the surface area of the by-products M1 that can be in contact with a cleaning gas becomes very smaller relative to the deposition volume. In order to remove the by-products M1 completely, a cleaning gas needs to be further supplied for a long time of, e.g., ten hours or more, although it depends on the deposition volume. Consequently, the cleaning time is prolonged too much, thereby lowering the operating rate of the apparatus.

The casing 4 may be disassembled by unfastening the bolts 8 of the lid 10, so that the trap body 6 is taken out of the casing 4 and cleaned by a cleaning solution. In this case, however, the maintenance operation is extensive, and thus the cleaning time is prolonged too much, thereby lowering the operating rate of the apparatus.

An embodiment of the present invention achieved on the basis of the findings given above will now be described with reference to the accompanying drawings. In the following description, the constituent elements having substantially the same function and arrangement are denoted by the same reference numerals, and a repetitive description will be made only when necessary.

Figure 1:
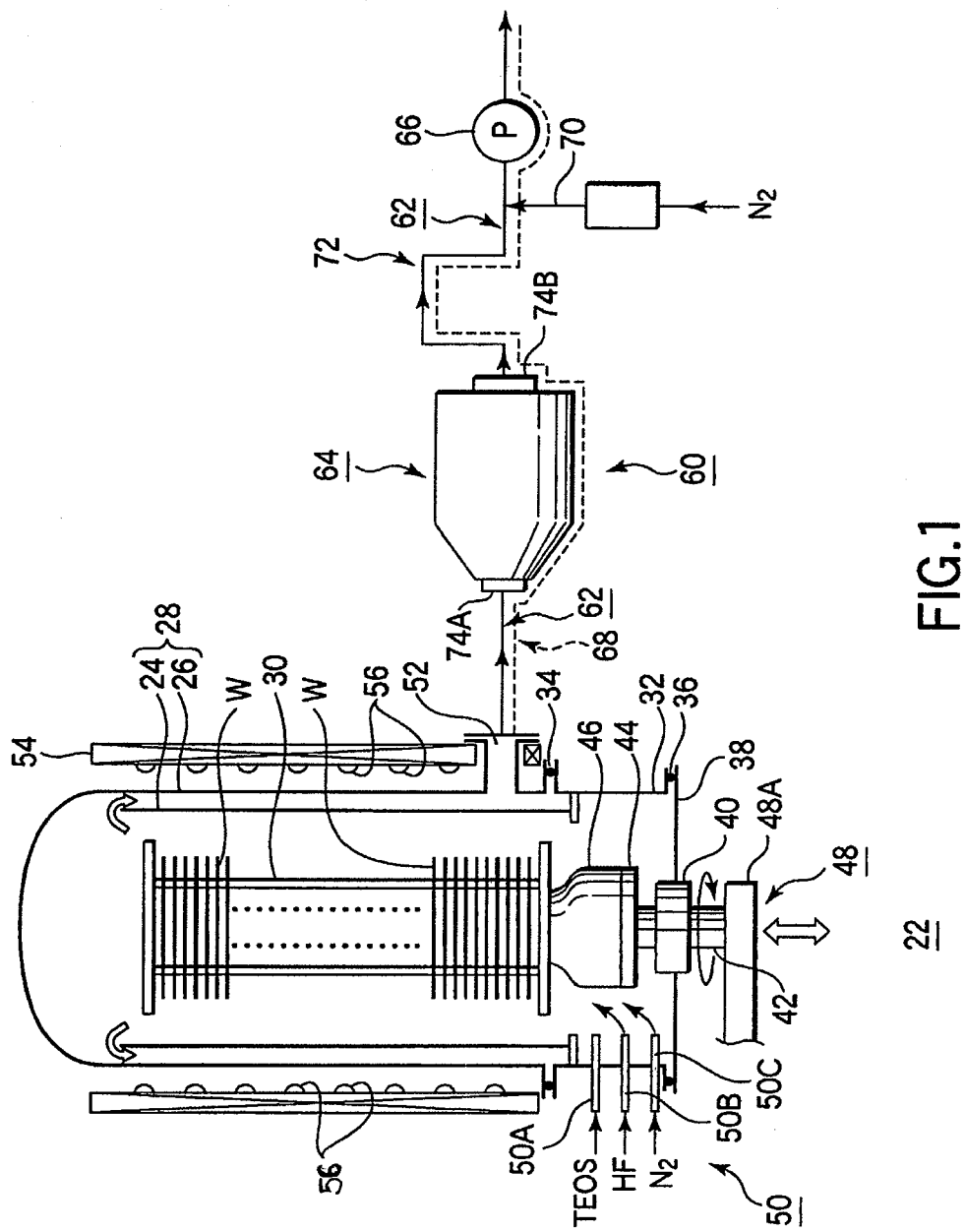
FIG. 1 is a sectional view showing a film formation apparatus (vertical CVD apparatus) according to an embodiment of the present invention.

FIG. 1 is a sectional view showing a film formation apparatus (vertical CVD apparatus) according to an embodiment of the present invention. This film formation apparatus 22 includes a vertical process container 28 made of quartz and having a double-tube structure formed of an inner tube 24 and an outer tube 26. The inner tube 24 is formed to accommodate a wafer boat 30 made of quartz for supporting target substrates. The wafer boat 30 is configured to support target substrates or semiconductor wafers W at predetermined intervals in the vertical direction. The intervals may be regular or irregular depending on the wafer position.

A cylindrical manifold 32 made of, e.g., stainless steel is connected to the bottom opening of the process container 28 with a seal member 34, such as an O-ring, interposed therebetween. The bottom opening of the manifold 32 is provided with a lid 38 for opening/closing this opening with a seal member 36, such as an O-ring, interposed therebetween. A rotary shaft 42 penetrates the lid 38 through a magnetic-fluid seal 40 fitted in the lid 38. The rotary shaft 42 is connected to a rotary table 44 at the top, on which the wafer boat 30 is mounted through a heat-insulating cylinder 46 made of quartz. The rotary shaft 42 is attached to an arm 48A of a boat elevator 48 movable in the vertical direction, so that the rotary shaft 42 is moved up and down along with the lid 38 and wafer boat 30. The wafer boat 30 is loaded and unloaded into and from the process container 28 from and to a lower side. The wafer boat 30 may be fixed without being rotatable. A part corresponding to the manifold 32 may be made of quartz and integrally formed with the process container.

A gas supply mechanism 50 is connected to the manifold 32 to supply predetermined gases into the process container 28. Specifically, the gas supply mechanism 50 includes a plurality of, such as three in this embodiment, nozzles 50A, 50B, and 50C penetrating the manifold 32, so that various gases are supplied from the nozzle 50A to 50C at controlled flow rates, as needed. In this embodiment, for example, TEOS gas for forming an $SiO_2$ thin film, HF gas used as a cleaning gas, and $N_2$ gas used as a carrier gas or purge gas are respectively supplied. The type of gas is not limited to those described above, and various gases may be used in accordance with a thin film to be formed.

Each of the gases supplied from the nozzles 50A, 50B, and 50C flows upward within the wafer process field or process space inside the inner tube 24, and turns around at the ceiling. Then, the gas flows downward through the gap between the inner tube 24 and outer tube 26, and is exhausted outside from an exhaust port 52 formed in the sidewall of the outer tube 26 near the bottom.

The process container 28 is surrounded by a cylindrical heat-insulating casing 54, which is provided with a heater 56 disposed on the inner surface to heat the wafers W placed inside to a predetermined temperature.

The exhaust port 52 formed in the sidewall of the process container 28 near the bottom is connected to an exhaust system 60 to vacuum-exhaust the interior of the process container 28. Specifically, the exhaust system 60 includes an exhaust passage 62 made of stainless steel and connected to the exhaust port 52 for the exhaust gas to flow therethrough. The exhaust passage 62 is provided with a collecting unit 64 along the passage to collect by-products contained in the exhaust gas flowing therethrough. The exhaust passage 62 is further provided with a vacuum pump 66 along the passage to vacuum-exhaust the interior of the process container 28.

The exhaust system 60 is covered with a detachable heat jacket 68 as a whole. The heat jacket 68 is used to heat the entire system 60 to prevent by-products in the exhaust gas from being deposited during a film formation process. This heating is also used to promote the reaction between by-products and a cleaning gas during a cleaning process. Further, this heating is also used to vaporize moisture generated by a reaction, so as to prevent the component materials of piping and so forth from being corroded.

The collecting unit 64 is located on the most upstream side of the exhaust passage 62, while the vacuum pump 66 is located downstream therefrom. A gas supply nozzle 70 for pressure control is connected to a portion of the exhaust passage 62 immediately upstream from the vacuum pump 66. The gas supply nozzle 70 is configured to supply an inactive gas, such as $N_2$ gas, at a controlled flow rate. This inactive gas is used to change the gas amount inside the process container 28, which is being vacuum-exhausted by the vacuum pump 66, so as to control the pressure inside the process container 28. In place of the gas supply nozzle 70 for pressure control, a pressure control valve, such as a butterfly valve, may be disposed on the exhaust passage 62. The exhaust passage 62 includes a crank portion 72 formed of a part of the passage 62 bent at right angles along the passage. The crank portion 72 may be inevitably formed due to arrangement of associated members and spaces.

Figure 2:
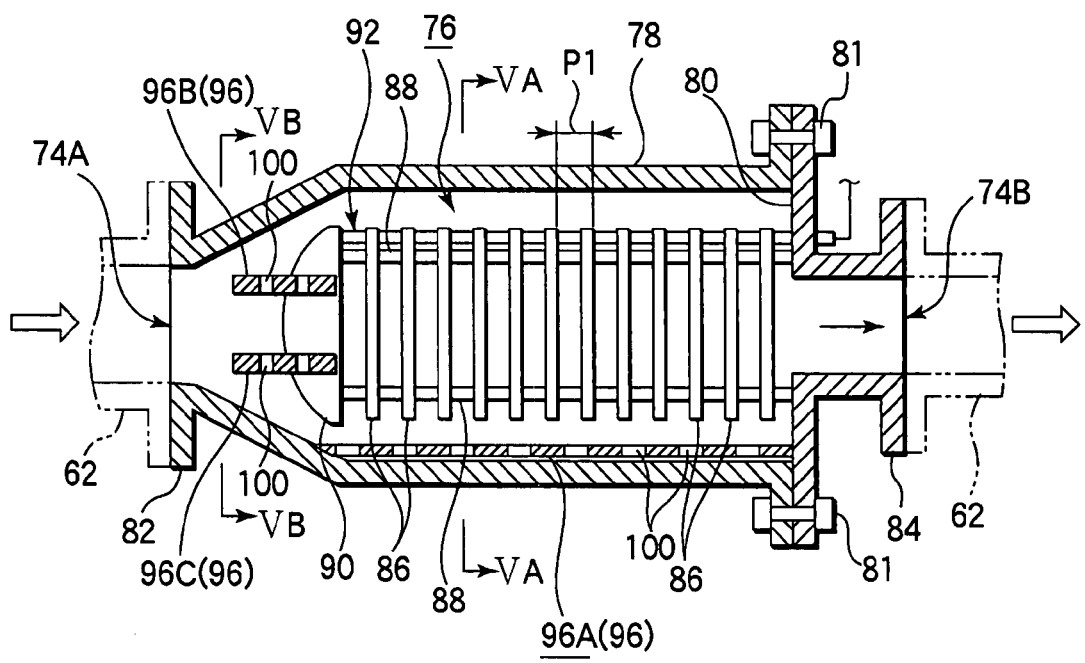
FIG. 2 is a sectional view showing a collecting unit used in the apparatus shown in FIG. 1.
Figure 3:
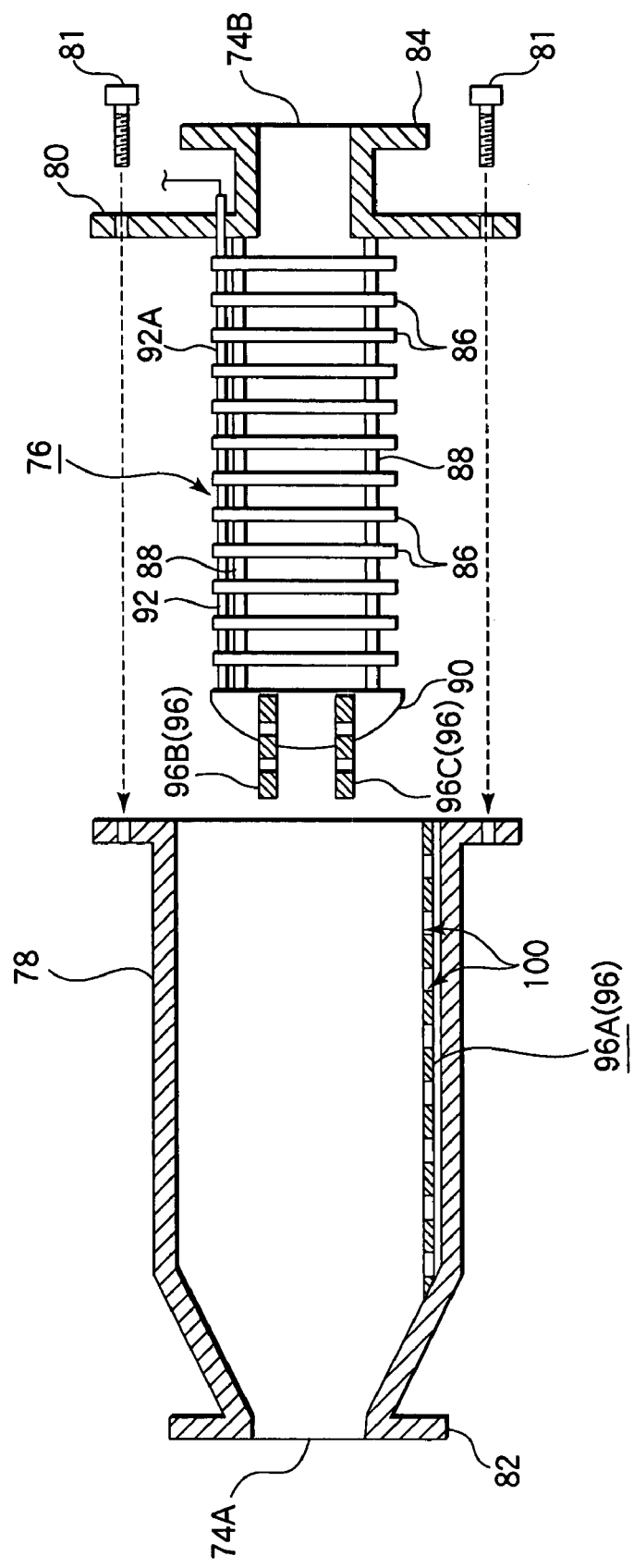
FIG. 3 is an exploded view of the collecting unit shown in FIG. 2.

FIG. 2 is a sectional view showing the collecting unit used in the apparatus shown in FIG. 1. FIG. 3 is an exploded view of the collecting unit shown in FIG. 2.

Figure 4:
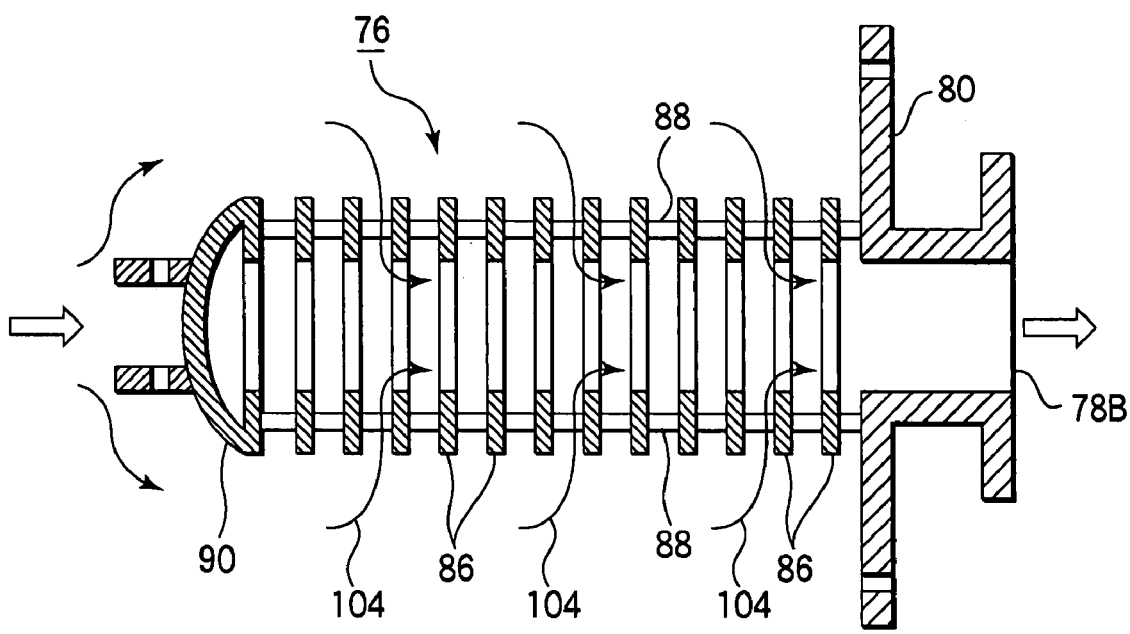
FIG. 4 is a sectional view showing a trap body, which is a part of the collecting unit shown in FIG. 2.
Figure 5A:
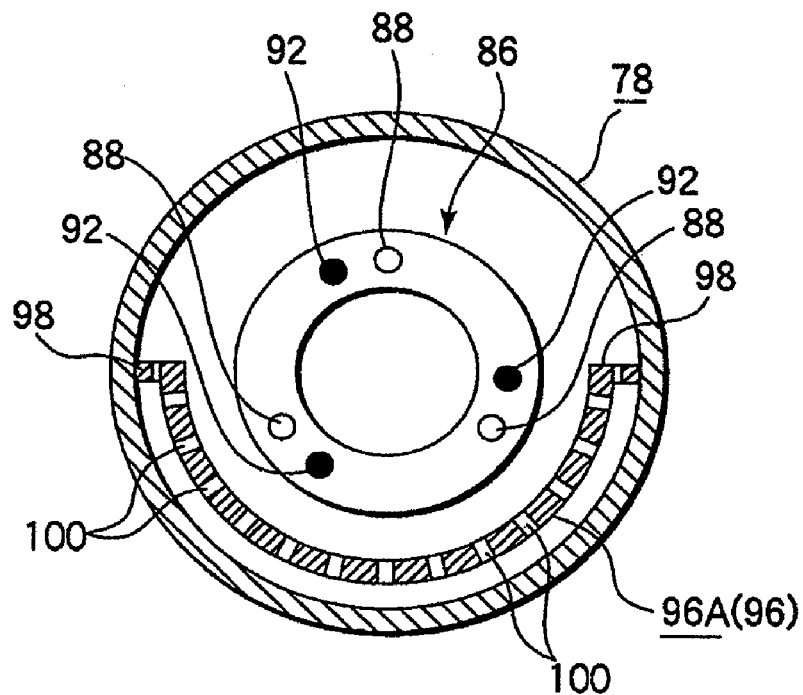
FIGS. 5A and 5B are sectional views taken along a line VA-VA and a line VB-VB in FIG. 2, respectively.
Figure 5B:
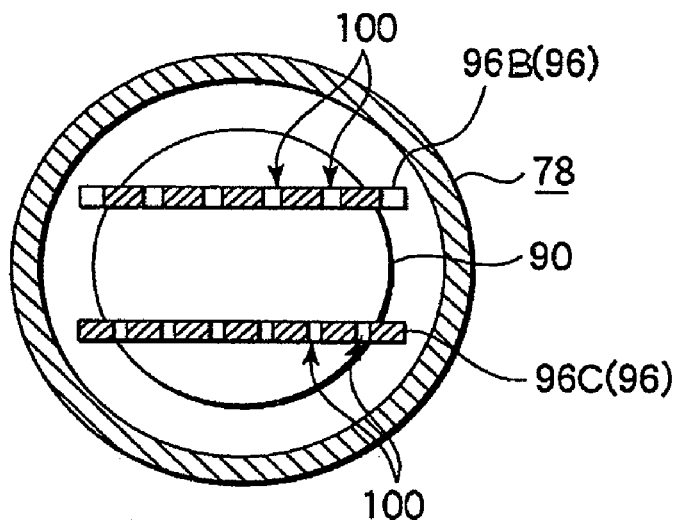

FIG. 4 is a sectional view showing a trap body, which is a part of the collecting unit shown in FIG. 2. FIGS. 5A and 5B are sectional views taken along a line VA-VA and a line VB-VB in FIG. 2, respectively. The collecting unit 64 includes a container-like casing 74, and a trap body 76 detachably disposed inside the casing 74 to collect by-products contained in the exhaust gas.

The casing 74 includes a cylindrical casing body 78 made of, e.g., stainless steel, as a whole. A lid 80 is detachably mounted by bolts 81 on an opening portion of the casing body 78 at the downstream side. The upstream side of the casing body 78 is gradually decreased in the sectional surface area and has a gas inlet 74A at the end. The gas inlet 74A is provided with a flange portion 82, which is connected to the upstream side of the exhaust passage 62. The lid 80 has a large opening at the center used as a gas outlet 74B. The gas outlet 74B is provided with a flange portion 84, which is connected to the downstream side of the exhaust passage 62. The exhaust gas enters from the gas inlet 74A, flows through the casing body 78, and then flows toward the downstream side from the gas outlet 74B.

The trap body 76 includes a plurality of fins 86 each made of, e.g., stainless steel and formed of a circular ring (doughnut) (see FIGS. 4 and 5A). The fins 86 are arrayed in parallel with each other at predetermined intervals P1, and are attached to a plurality of support rods 88 that penetrate the fins 86. FIG. 2 shows two support rods 88, but there are actually three support rods 88 disposed equidistantly in an annular direction on the fins 86, as shown in FIG. 5A. For example, the intervals P1 are about 0.5 to 2 mm, and the number of fins 86 is 100, although they depend on the length of the trap body 76.

The support rods 88 are connected to a cover 90 on the upstream side, which has, e.g., a semispherical or curved (dome) shape. The cover 90 is configured to spread the exhaust gas flowing from the upstream side and to prevent the gas from directly flowing into the central passage of the ring fins 86. The support rods 88 are connected and fixed to the lid 80 of the casing 74 on the downstream side. Accordingly, as shown in FIG. 3, when the bolts 81 of the lid 80 are unfastened, the trap body 76 can be detached together with the lid 80 from the casing body 78.

The trap body 76 is further provided with a rod-like trap heater 92 penetrating the fins 86 in parallel with the support rods 88 (see FIGS. 2 and 3). The trap heater 92 is formed of a plurality of rod-like cartridge heaters 92A, i.e., three heaters 92A disposed equidistantly in an annular direction on the fins 86, as shown in FIG. 5A. Each of the cartridge heaters 92A includes a thermocouple (not shown) for measuring temperature. With this arrangement, the trap body 76 including the fins 86 is heated and controlled to a predetermined temperature during a cleaning process. FIGS. 2 and 3 show only one cartridge heater, as an example.

The collecting unit 64 is provided with a receiving mechanism 96 therein to receive by-products dropping while a cleaning gas is supplied. In the case shown in FIG. 2, the collecting unit 64 is set in a horizontal state, i.e., the longitudinal direction aligns with a horizontal direction. The receiving mechanism 96 includes one or more receiving members stacked at intervals in the vertical direction. In this embodiment, as shown in FIGS. 2, 5A, and 5B, the receiving mechanism 96 includes receiving members irregularly disposed at three height levels. Specifically, a bottom receiving member 96A is disposed along the inner surface of the casing 74 near the bottom (the lower side in FIG. 2) with a predetermined gap therebetween to cover a semicircular portion of the cylindrical casing body 78. The bottom receiving member 96A has a semicircular sectional shape (see FIG. 5A), and expands over the longitudinal direction of the casing body 78, as shown in FIG. 2.

The bottom receiving member 96A includes rib flanges 98 bent outward at about right angles at the upper ends. The sides of the rib flanges 98 are connected and fixed to the inner surface of the casing body 78, so that the bottom receiving member 96A is supported. The bottom receiving member 96A is used to receive by-products dropping from above during a cleaning process and prevent the by-products from being deposited on the bottom of the casing body 78. The bottom receiving member 96A is formed of a member having a number of vent-holes 100, such as a metal mesh (wire netting) member or punching metal member made of, e.g. stainless steel. Even after by-products are deposited thereon, the receiving member 96A allows the exhaust gas or cleaning gas to pass therethrough without a large resistance, i.e., does not decrease the exhaust conductance so much. This feature is common to all the receiving members described later.

Upstream receiving members 96B and 96C extending in horizontal directions are attached to the surface of the cover 90 of the trap body 76 at a predetermined interval in the vertical direction (see FIG. 5B). Since the exhaust gas directly comes into contact with the surface of the cover 90, by-products are trapped on this portion in quantity. Accordingly, the upstream receiving members 96B and 96C are disposed, as described above, to receive by-products dropping along the surface of the cover 90 during a cleaning process. The upstream receiving members 96B and 96C are formed of a member having vent-holes 100, such as a metal mesh member or punching metal member made of, e.g. stainless steel. An upstream receiving member or members may be disposed at only one level or at three or more levels.

Next, an explanation will be given of a film formation process for depositing an $SiO_2$ film on semiconductor wafers W by use of TEOS in the processing apparatus described above.

When the film formation apparatus 22 is in an idling state without semiconductor wafers W loaded therein, the interior of the process container 28 is maintained at a temperature lower than the process temperature. When the process is started, a number of unprocessed semiconductor wafers W are placed on the wafer boat 30 at predetermined intervals. Then this wafer boat 30 is moved upward by the boat elevator 48 and is loaded into the process container 28 from below. Further, the bottom opening of the process container 28 is closed by the lid 38 to airtightly seal the process container 28.

Then, the power applied to the heater 56 is increased to heat the wafers W to a predetermined process temperature, and the interior of the process container 28 is vacuum-exhaust by the exhaust system 60. Further, TEOS gas is supplied at a controlled flow rate from the predetermined nozzle 50A of the gas supply mechanism 50 into the process container 28. The TEOS gas flows upward inside the process container 8, and causes a thermal decomposition reaction, thereby depositing an $SiO_2$ film on the surface of the wafers W.

During this film formation, the atmosphere inside the process container 28 is vacuum-exhausted by the vacuum pump 66 of the exhaust system 60, as described above. The gas exhausted from the exhaust port 52 of the process container 28 flows downstream through the exhaust passage 62, collecting unit 64, and vacuum pump 66, in this order. This exhaust gas contains by-products generated by the $SiO_2$ film formation reaction. Accordingly, when the exhaust gas flows through the collecting unit 64, by-products are removed from the exhaust gas.

In order to prevent by-products from being deposited on portions other than the collecting unit 64, the heat jacket 68 covering the exhaust system 60 is operated to heat the entire exhaust system 60 to, e.g., about 150° C. The exhaust gas from the gas inlet 74A flows downstream inside the casing body 78 of the casing 74, while passing through the center of the fins 86 of the trap body 76, as indicated by arrows 104 in FIG. 4. Then, the exhaust gas flows downstream through the gas outlet 74B formed in the lid 80. When the exhaust gas flows inside the collecting unit 64, by-products contained in the exhaust gas are deposited on portions which the exhaust gas comes into contact with, so the by-products are trapped and removed from the exhaust gas.

The by-products are removed (trapped) while they are deposited mainly on the surface of the fins 86 in quantity. Further, some of the by-products are deposited and removed by the surface of the cover 90, the inner surface of the trap body 76, and the receiving members 96A to 96C, which the exhaust gas comes into direct contact with. The by-products contain $SiO_2$ as the main component. Where the trap body 76 is cooled by a cooling mechanism disposed therein to circulate a cooling medium, the by-product can be more efficiently remove.

After the film formation process is finished, supply of TEOS gas is stopped, and the residual gas inside the process container 28 is purged and exhausted by, e.g., $N_2$ gas. Then, the wafer boat 30 is moved downward to unload the processed wafers W.

Repeating this film formation process a plurality of times, unnecessary films ($SiO_2$ films derived from TEOS) are deposited on the interior components, such as the inner surface of the process container 28 including the inner tube 24 and outer tube 26, the surface of the wafer boat 30, the surface of the heat-insulating cylinder 46. Accordingly, a cleaning process is preformed periodically or non-periodically to etch and remove the unnecessary films. In this cleaning process, the wafer boat 30 that holds no wafers W (in an empty state) is loaded into the process container 28, which is then airtightly closed.

Then, while the temperature inside the process container 28 is maintained at a predetermined value, HF gas is supplied as a cleaning gas at a controlled flow rate from the nozzle 50B into the process container 28. Further, $N_2$ gas is supplied as a dilution gas at a controlled flow rate from the nozzle 50C into the process container 28.

The HF gas thus supplied into the process container 8 flows inside the process container 28 while coming into contact with the surface of the heat-insulating cylinder 46, wafer boat 30, inner tube 24, and outer tube 26. Consequently, silicon oxide films ($SiO_2$) derived from TEOS and deposited on these portions are etched and cleaned. The cleaning gas is vacuum-exhausted into the exhaust system 60, and further reacts with by-products containing $SiO_2$ as the main component and deposited inside the exhaust system 60, thereby removing the by-products.

At this time, the cleaning gas or HF gas reacts with SiO$_2$ as shown in the following formula, and generates SiF$_4$, which is vaporized and exhausted, thereby removing the by-products.

$$4HF+SiO_2 \rightarrow SiF_4+2H_2O$$

In order to promote this reaction, and to vaporize generated moisture (H$_2$O) to prevent corrosion of the component material, i.e., stainless steel, the heat jacket 68 is operated to maintain the exhaust system 60 at, e.g., about 150° C., as a whole. Further, also in the collecting unit 64, the trap heater 92 is operated to heat the trap body 76 at, e.g., about 100° C. This cleaning is arranged to use the following process conditions, for example. The temperature inside the process container is set at 500° C. The pressure inside the process container is set at 150 Torr. The gas flow rate is set at HF/N$_2$=3/3 liters/min. The temperature inside the exhaust passage is set at 150° C.

When this cleaning process proceeds to some extent, by-products deposited on the surface inside the collecting unit 64 decrease their adhesive force due to moisture generated by the reaction and peel off from the surface. In this respect, according to the conventional collecting unit, as shown in FIG. 11, a pile of by-products are deposited on the bottom. It takes a long time to completely remove such by-products, or it is necessary to disassemble the collecting unit if the by-products cannot be completely removed.

Figures 6A, 6B:
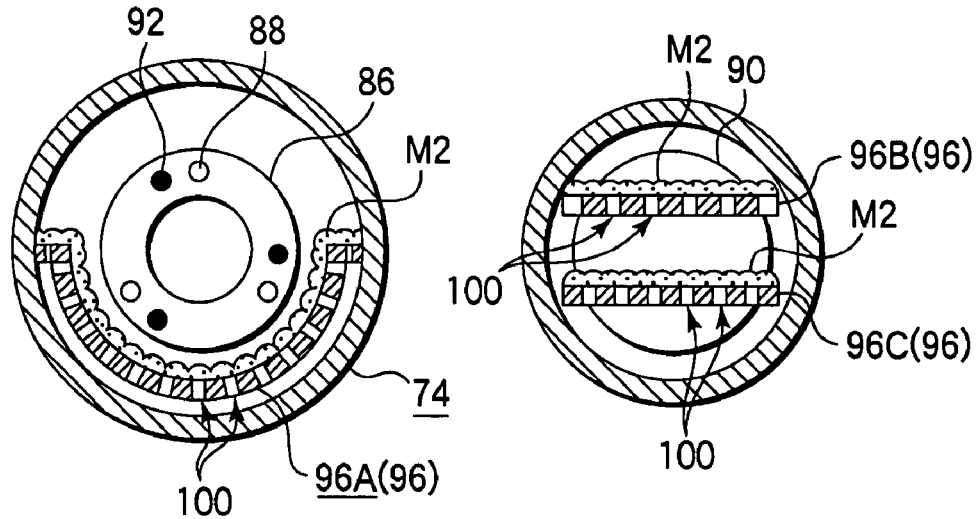
FIGS. 6A to 6C are sectional views corresponding to the sectional views shown in FIGS. 5A, 5B, and 2, and showing a state where by-products are held on receiving members.
Figure 6C:
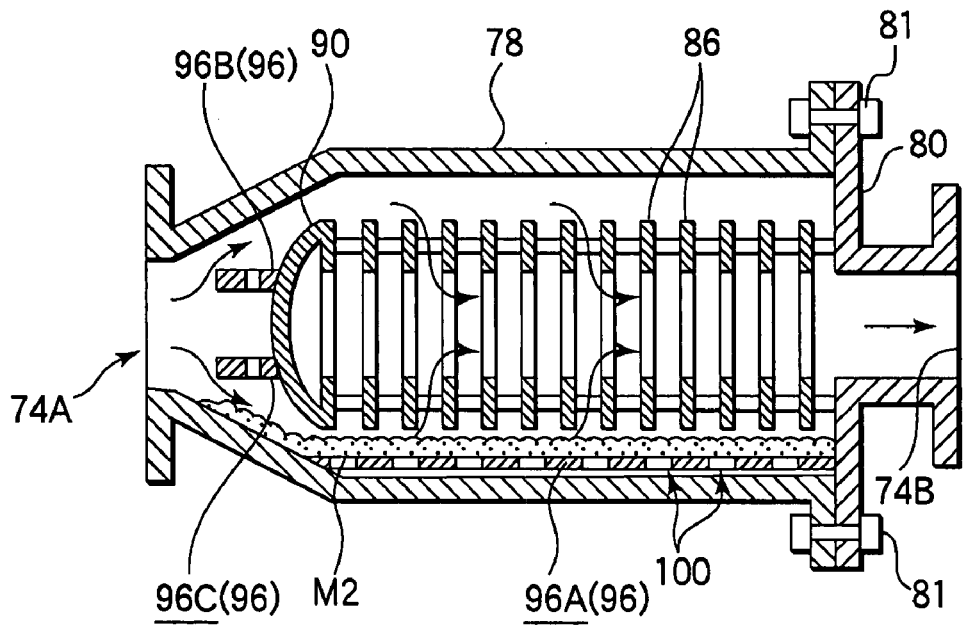

On the other hand, according to this embodiment, by-products peeling off and dropping from the surface are received and held as by-products M2 on the way by the receiving members 96A to 96C of the receiving mechanism 96 disposed inside the collecting unit 64. FIGS. 6A to 6C are sectional views corresponding to the sectional views shown in FIGS. 5A, 5B, and 2, and showing a state where by-products are held on receiving members.

As shown in FIGS. 6A to 6C, a lot of by-products M2 peeling off and dropping from the surface are deposited on the bottom receiving member 96A disposed near the bottom of the casing body 78 and the upper and lower upstream receiving members 96B and 96C disposed on the cover 90 of the trap body 76. However, the receiving members 96A to 96C are formed of a member having vent-holes 100, such as a wire netting member or punching metal member, and the by-products M2 held on the receiving members 96A to 96C can be in contact with the cleaning gas from above and from below. In other word, the surface area of the by-products M2 to be in contact with the cleaning gas is kept far larger than that of the by-products M1 shown in FIG. 11. Accordingly, the reaction with the cleaning gas is promoted, so that the by-products can be efficiently removed by that much.

As described above, the collecting unit 64 is provided with receiving members 96A to 96C therein to receive by-products dropping from above during the cleaning process. The by-products thus held is maintained in a state where they can be efficiently brought into contact with the cleaning gas. Consequently, the by-products M2 can be efficiently removed, thereby allowing collected by-products to be reliably and efficiently removed in a short time by the cleaning process.

EXPERIMENT

The collecting unit 64 provided with the receiving mechanism 96 shown in FIG. 2 and so forth and the collecting unit 2 shown in FIG. 11 were actually used for a cleaning process and then examined. In this experiment, a process for forming an SiO$_2$ film was first performed by use of TEOS, and the, when the cumulative film thick reached 2.7 μm, a cleaning process was performed for 180 minutes under the conditions described previously.

As a result, where the collecting unit 2 shown in FIG. 11 was used, the quantity of by-products was decreased from 172.9 g measured before the cleaning process to 35.1 g measured as residues after the cleaning process. Accordingly, the percentage of the residues was 20%. On the other hand, where the collecting unit 64 was used, the quantity of by-products was decreased from 169.5 g measured before the cleaning process to 4.5 g measured as residues after the cleaning process. Accordingly, the percentage of the residues was 7.2%, which was a remarkable improvement from 20% of the conventional unit.

First Modification

Figure 7:
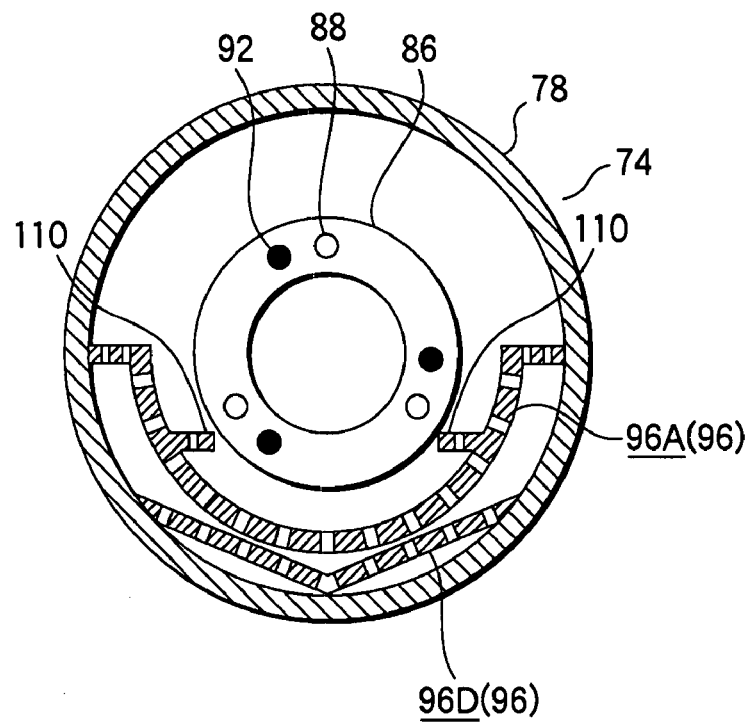
FIG. 7 is a sectional view showing a collecting unit according to a first modification.

FIG. 7 is a sectional view showing a collecting unit according to a first modification. In this modification, shelf portions 110 having a short width and projecting in a horizontal direction from opposite positions are added on the inner side of the bottom receiving member 96A having a semicircular cross section shown in FIGS. 5A and 5B. The shelf portions 110 are disposed to extend over the longitudinal direction of the casing body 76. The shelf portions 110 serve to prevent by-products from sliding on the curved surface of the bottom receiving member 96A, and to receive by-products dropping from above. The shelf portions 110 are formed of a member having vent-holes, such as a wire netting member or punching metal member, as in the bottom receiving member 96A. Further, a second bottom receiving member 96D is disposed below the bottom receiving member 96A to extend over the longitudinal direction of the casing body 76.

Where the two bottom receiving members 96A and 96D are disposed, by-products dropping from the upper bottom receiving member 96A are received by the second bottom receiving member 96D on the lower side. Accordingly, by-products are prevented from being deposited on the bottom of the casing body 76, and the cleaning efficiency is further improved by that much.

Where the shelf portions 110 are added on the inner side of the bottom receiving member 96A, received by-products are kept distributed without being gathered. Accordingly, the cleaning efficiency is further improved by that much.

Second Modification

Figure 8:
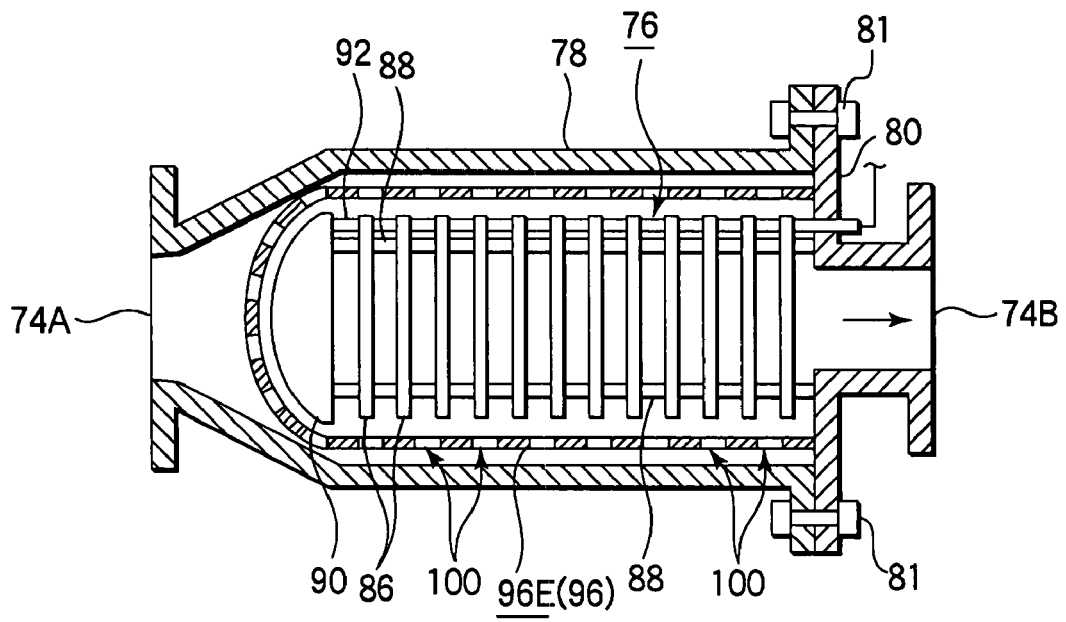
FIG. 8 is a sectional view showing a collecting unit according to a second modification.

FIG. 8 is a sectional view showing a collecting unit according to a second modification. In this modification, a receiving mechanism 96 comprises a cylindrical receiving member 96E disposed between the trap body 76 and the inner surface of the casing body 78 all around the trap body 76. This modification can provide the same effects as the embodiment and modification described above.

Third Modification

Figure 9:
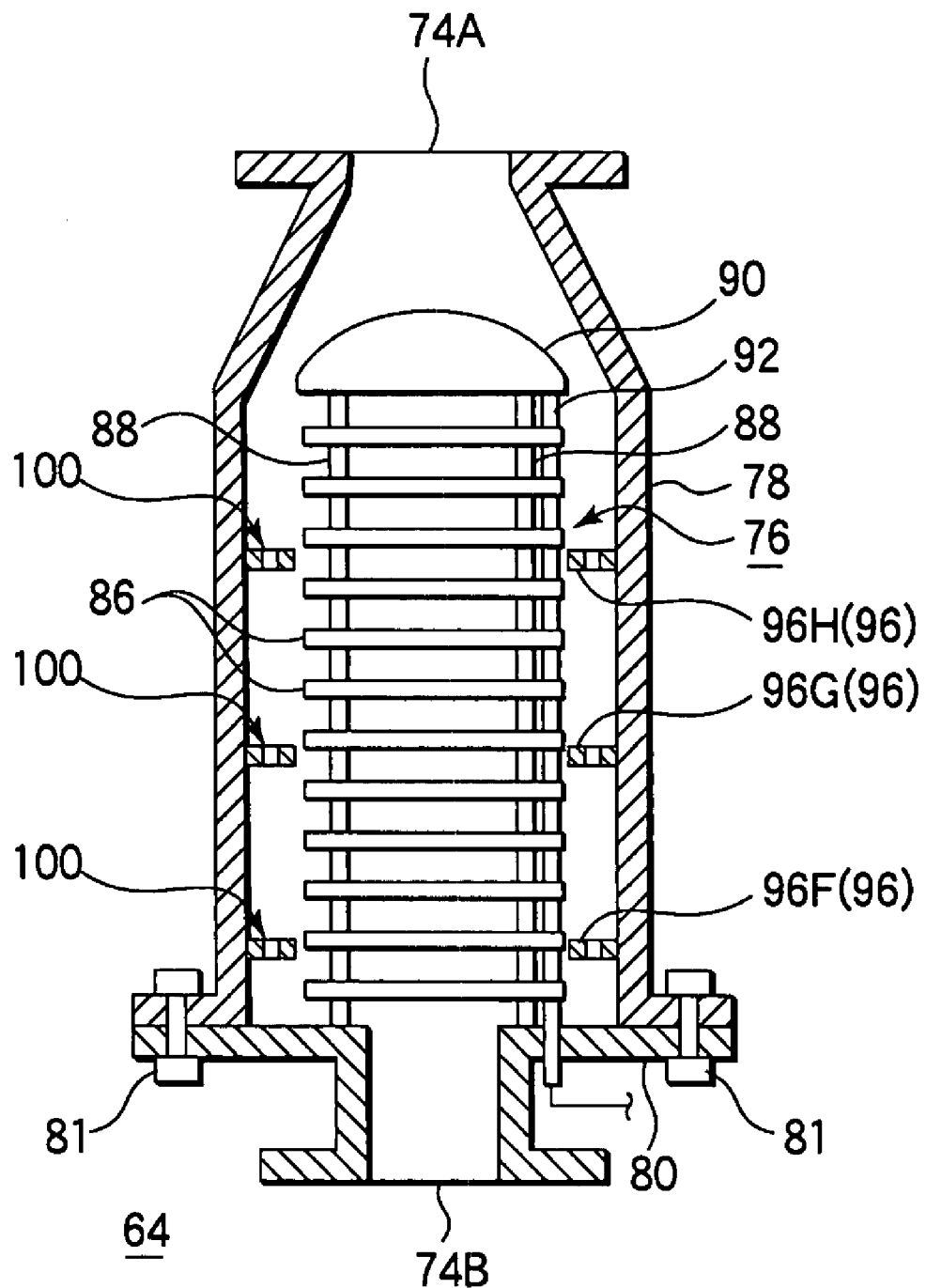
FIG. 9 is a sectional view showing a collecting unit according to a third modification.

FIG. 9 is a sectional view showing a collecting unit according to a third modification. In the embodiment and first and second modifications described above, the collecting unit 64 is set such that the longitudinal direction aligns with a horizontal direction. On the other hand, in the third modification, the collecting unit is set such that the longitudinal direction aligns with a vertical direction. In this case, a receiving mechanism 96 comprises a plurality of receiving members formed of circular ring shelf portions. In FIG. 9, ring shelf receiving members 96F, 96G, and 96H are disposed at three height levels in the vertical direction of the casing body 78.

In this case, shelf receiving members 96F to 96H receive by-products dropping from above during a cleaning process, and keep them in a distributed state while preventing them from being deposited on the bottom. Accordingly, this modification can provide the same effects as the embodiment and first and second modifications described above. The embodiment and first to third modifications may be suitably combined in use.

<Receiving Member in Exhaust Passage>

In the embodiment and modifications described above, a receiving mechanism 96 is built in the collecting unit. Alternatively, a receiving mechanism 96 may be built in the exhaust passage 62. Specifically, as shown in FIG. 1, the exhaust passage 62 includes the crank portion 72 formed of a part of the passage 62 bent at right angles along the passage, wherein the crank portion 72 may be inevitably formed due to arrangement of associated members and spaces. Since the flow direction of the exhaust gas is greatly changed in the crank portion 72, by-products tend to be deposited on the inner surface of the exhaust passage 62. In this respect, where such a crank portion 72 is located upstream from the collecting unit 62, by-products are easily deposited. Ever where such a crank portion 72 is located downstream from the collecting unit 62, however, some by-products not removed by the collecting unit 64 can be sent downstream and deposited inside the crank portion 72.

Figure 10:
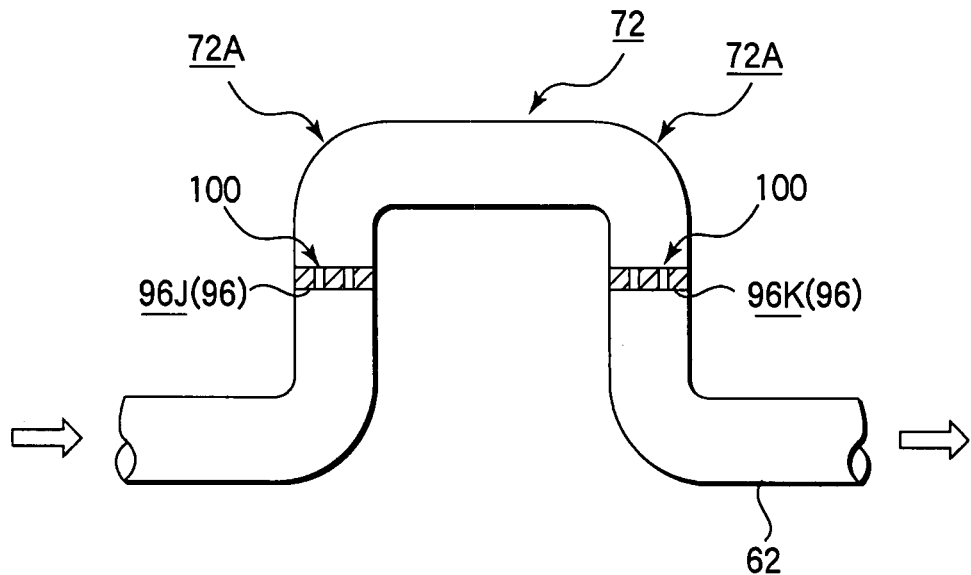
FIG. 10 is a sectional view showing a state where receiving members are disposed inside an exhaust passage.

FIG. 10 is a sectional view showing a state where receiving members are disposed inside a rising portion and a falling portion of an exhaust passage. Specifically, at the crank portion 72, a rising portion and a falling portion of the exhaust passage 62 are provided with piping receiving members 96J and 96K that across the exhaust passage 62 to construct a receiving mechanism 96. Also in this case, the piping receiving members 96J and 96K are formed of a member having vent-holes, such as a wire netting member or punching metal member.

In FIG. 10, by-products deposited on the corners 72A of the crank portion 72 peel off and drop during a cleaning process. Accordingly, the piping receiving members 96J and 96K receive by-products dropping from above to prevent the by-products from being deposited on the bottom of the crank portion 72. Since the by-products are kept distributed without being gathered, this arrangement can provide the same effects as the embodiment and first to third modifications described above.

Other Modifications

The embodiment described above is exemplified by a process for forming an $SiO_2$ film. The film of this kind may be formed while being doped with B (boron) or P (phosphorous). The type of a thin film to be formed is not limited to a silicon oxide film ($SiO_2$), and it may be another thin film, such as a silicon nitride film or silicon oxynitride film. Where a silicon nitride film is formed, the process gas supply circuit is arranged to supply a silicon source gas and a nitriding gas, such as $NH_3$ gas. Where a silicon oxynitride film is formed, the process gas supply circuit is arranged to supply a silicon source gas and an oxynitriding gas, such as dinitrogen oxide ($N_2O$) or nitrogen oxide (NO).

The cleaning gas is not limited to HF gas, and it may be suitably selected from various gases, in accordance with the type of a thin film to be formed. Specifically, where a cleaning process is performed for a silicon oxide film, silicon nitride film, or silicon oxynitride film, the cleaning gas may contain one or more gases selected from the group consisting of HF, $Cl_2$, $NF_3$, and $F_2$. For example, where a silicon nitride film is removed, a cleaning gas containing $F_2$ and $H_2$ may be used.

In the embodiment described above, the processing apparatus is exemplified by the batch type. Alternatively, the present invention may be applied to a processing apparatus of the single-substrate type that processes wafers one by one. The target substrate is not limited to a semiconductor wafer W, and it may be a glass substrate, LCD substrate, or ceramic substrate.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A collecting unit to be disposed on an exhaust passage of a semiconductor processing apparatus to collect by-products contained in an exhaust gas flowing through the exhaust passage, the collecting unit comprising:
   a casing having a gas inlet and a gas outlet and configured to form a part of the exhaust passage;
   a trap body detachably disposed inside the casing and configured to collect a part of the by-products contained in the exhaust gas, the trap body including a plurality of fins arrayed in a flow direction of the exhaust gas, and each of the fins having a surface on which a part of the by-products is deposited and trapped; and
   a receiving mechanism disposed inside the casing and configured to receive a part of the by-products that peels off from the trap body or an inner surface of the casing to prevent this part from being deposited on a bottom of the casing, the receiving mechanism being configured to allow a part of the by-products held thereon to be in contact with a cleaning gas from above and from below,
   wherein the receiving mechanism comprises a board disposed to expand along an inner surface of the casing with a predetermined gap interposed therebetween and having a number of vent-holes which the cleaning gas passes through, and the board comprises a lower portion disposed below the trap body and interposed between the trap body and the inner surface of the casing half around the trap body.

2. The collecting unit according to claim 1, wherein the board comprises a member selected from the group consisting of a metal mesh member and a punching metal member.

3. The collecting unit according to claim 1, wherein the receiving mechanism further comprises a lateral portion disposed beside the trap body.

4. The collecting unit according to claim 1, wherein
   the trap body includes a cover disposed on an upstream side to spread a gas flow, and
   the receiving mechanism further comprises an upstream portion attached to the cover.

5. The collecting unit according to claim 1, wherein the receiving mechanism further comprises a shelf portion projecting from the board toward the trap body.

6. The collecting unit according to claim 5, wherein the shelf portion has vent-holes which the cleaning gas passes through.

7. The collecting unit according to claim 1, wherein the board is interposed between the trap body and the inner surface of the casing all around the trap body.

8. The collecting unit according to claim 1, wherein the receiving mechanism further comprises a plurality of boards arrayed at intervals in a vertical direction and having a number of vent-holes which the cleaning gas passes through.

9. The collecting unit according to claim 1, wherein the trap body includes a trap heater configured to heat the trap body.

10. A collecting unit to be disposed on an exhaust passage of a semiconductor processing apparatus to collect by-products contained in an exhaust gas flowing through the exhaust passage, the collecting unit comprising:
   a casing having a gas inlet and a gas outlet and configured to form a part of the exhaust passage;
   a trap body detachably disposed inside the casing and configured to collect a part of the by-products contained in the exhaust gas, the trap body including a plurality of fins arrayed in a flow direction of the exhaust gas, and each of the fins having a surface on which a part of the by-products is deposited and trapped; and
   a receiving mechanism disposed inside the casing and configured to receive a part of the by-products that peels off from the trap body or an inner surface of the casing to prevent this part from being deposited on a bottom of the casing, the receiving mechanism being configured to allow a part of the by-products held thereon to be in contact with a cleaning gas from above and from below, wherein
   the trap body includes a cover disposed on an upstream side to spread a gas flow, and
   the receiving mechanism further comprises an upstream portion attached to the cover.

11. A collecting unit to be disposed on an exhaust passage of a semiconductor processing apparatus to collect by-products contained in an exhaust gas flowing through the exhaust passage, the collecting unit comprising:
   a casing having a gas inlet and a gas outlet and configured to form a part of the exhaust passage;
   a trap body detachably disposed inside the casing and configured to collect a part of the by-products contained in the exhaust gas, the trap body including a plurality of fins arrayed in a flow direction of the exhaust gas, and each of the fins having a surface on which a part of the by-products is deposited and trapped; and
   a receiving mechanism disposed inside the casing and configured to receive a part of the by-products that peels off from the trap body or an inner surface of the casing to prevent this part from being deposited on a bottom of the casing, the receiving mechanism being configured to allow a part of the by-products held thereon to be in contact with a cleaning gas from above and from below, wherein the receiving mechanism comprises:
   a board disposed to expand along an inner surface of the casing with a predetermined gap interposed therebetween and having a number of vent-holes which the cleaning gas passes through, and
   a shelf portion projecting from the board toward the trap body.

12. The collecting unit according to claim 11, wherein the shelf portion has vent-holes which the cleaning gas passes through.

13. A film formation apparatus for a semiconductor process, comprising:
   a process container configured to accommodate a target substrate;
   a support member configured to support the target substrate inside the process container;
   a heater configured to heat the target substrate inside the process container;
   an exhaust system configured to exhaust an interior of the process container;
   a film formation gas supply circuit configured to supply a film formation gas into the process container; and
   a cleaning gas supply circuit configured to supply a cleaning gas into the process container,
   wherein the exhaust system includes a collecting unit disposed on the exhaust passage to collect by-products contained in an exhaust gas flowing through the exhaust passage, and the collecting unit comprises:
   a casing having a gas inlet and a gas outlet and configured to form a part of the exhaust passage,
   a trap body detachably disposed inside the casing and configured to collect a part of the by-products contained in the exhaust gas, the trap body including a plurality of fins arrayed in a flow direction of the exhaust gas, and each of the fins having a surface on which a part of the by-products is deposited and trapped, and
   a receiving mechanism disposed inside the casing and configured to receive a part of the by-products that peels off from the trap body or an inner surface of the casing to prevent this part from being deposited on a bottom of the casing, the receiving mechanism being configured to allow a part of the by-products held thereon to be in contact with a cleaning gas from above and from below, and
   wherein the exhaust system comprises an additional receiving mechanism disposed at a position inside the exhaust passage other than the collecting unit to receive a part of the by-products that peels off from an inner surface of the exhaust passage to prevent this part from being deposited on a bottom of the exhaust passage, the additional receiving mechanism being configured to allow a part of the by-products held thereon to be in contact with the cleaning gas from above and from below.

14. The film formation apparatus according to claim 13, wherein the receiving mechanism comprises a board having a number of vent-holes which the cleaning gas passes through.

15. The film formation apparatus according to claim 14, wherein the board is disposed to expand along an inner surface of the casing with a predetermined gap interposed therebetween.

16. The film formation apparatus according to claim 13, wherein the film formation gas comprises a gas for forming a film selected from the group consisting of a silicon oxide film, a silicon oxynitride film, and a silicon nitride film.

17. The film formation apparatus according to claim 16, wherein the cleaning gas comprises one or more gases selected from the group consisting of HF, $Cl_2$, $NF_3$, and $F_2$.

18. The film formation apparatus according to claim 13, wherein the additional receiving mechanism is disposed inside a rising portion or a falling portion of the exhaust passage.

* * * * *